United States Patent Office 3,393,203
Patented July 16, 1968

3,393,203
D-RING LACTONES
Gerald W. Krakower, Elizabeth, N.J., assignor to E. R.
Squibb & Sons, Inc., New York, N.Y., a corporation
of Delaware
No Drawing. Filed Apr. 22, 1966, Ser. No. 544,408
4 Claims. (Cl. 260—340.9)

ABSTRACT OF THE DISCLOSURE

This invention relates to D-ring lactone compounds of the formula

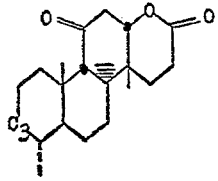

and R is acyl. These compounds have been found to possess anti-estrogenic activity.

---

This invention relates to and has as its object the provision of new physiologically active steroids, novel methods for their production and new intermediates useful in said preparation. More particularly, this invention relates to the preparation of novel D-ring lactone compounds of the formula

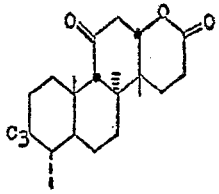

wherein $C_3$ is selected from the group consisting of

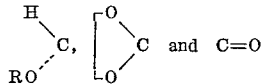

and R is acyl.

The preferred acyl radicals are those of hydrocarbon carboxylic acids of less than twelve carbon atoms, as exemplified by the lower alkanoic acids (e.g., acetic, propionic, butyric and tert-pentanoic acid), the lower alkenoic acids, the monocyclic aryl carboxylic acids (e.g., benzoic and toluic acids), the monocyclic aryl lower alkanoic acids (e.g., phenacetic and β-phenylpropionic-acids), the cycloalkane carboxylic acids and the cycloalkene carboxylic acids.

The novel intermediates and end products of this invention are physiologically active steroids which possess anti-estrogenic activity. They may be formulated for such administration in the manner and/or dosage as determined by the respective compound involved and the requirements of the patient.

The final compounds of this invention may be prepared according to the process of this invention which may be represented by the following equations:

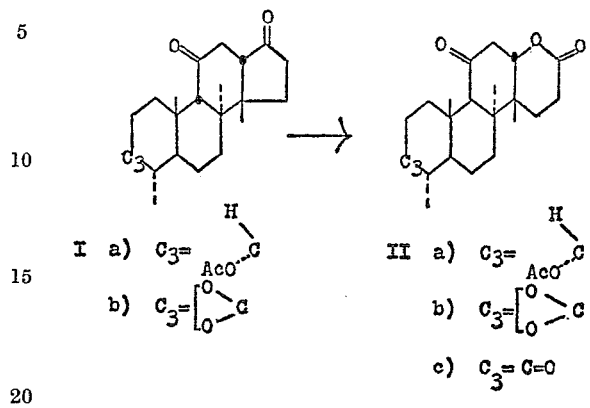

The preparation of the starting materials for the instant invention may be found in co-pending application, Ser. No. 455,002, filed May 11, 1965, now U.S. Patent 3,352,-854. In order to prepare the 3α-acyloxy compounds of this invention, starting material, Compound I(a) is reacted with an organic peracid, e.g., m-chloroperbenzoic acid in a suitable solvent to yield D-ring lactone, Compound II(a). By a similar reaction, starting material, Compound I(b) is reacted with an organic peracid, e.g., m-chloroperbenzoic acid in a suitable solvent to yield II(b). Hydrolysis of Compound II(b), as by reacting it with organic or inorganic acids, e.g., aqueous acetic acid or dilute sulfuric acid will yield the 3-oxo compound, Compound II(c).

The invention may be further illustrated by the following examples:

Example 1.—3α-acetoxy - 4α,8,14-trimethyl-17a-oxa-D-homo-18-nor-5α,8α,9β,14β-androstane-11,17-dione A solution of 354 mg. of 3α-acetoxy-4α,8,14-trimethyl-18-nor-5α,8α,9β,14β-androstane-11,17-dione and 690 mg. of m-chloroperbenzoic acid in 10 ml. of methylene chloride is kept at room temperature in the dark for four days. The reaction mixture is diluted with benzene and washed successively with 5% potassium iodide, 5% sodium sulfite, saturated sodium chloride, 5% potassium bicarbonate and saturated sodium chloride solutions, dried and evaporated. Recrystallization of the residue from methanol gives 86 mg. of 3α-acetoxy-4α,8,14-trimethyl-17a-oxa-D-homo-18 - nor - 5α,8α,9β,14β-androstane-11,17-dione, M.P. 197–199° C. The analytical sample has melting point 201–202° C. $[\alpha]_D -54°$ (chloroform).

Analysis.—Calc'd for $C_{23}H_{34}O_5$: C, 70.74; H, 8.78. Found: C, 70.83; H, 8.96.

Example 2.—3-ethylenedioxy-4α,8,14-trimethyl-17a-oxa-D-homo-18-nor-5α,8α,9β,14β-androstane-11,17-dione Following the procedure of Example 1 but substituting 3-ethylenedioxy-4α,8,14 - trimethyl-18-nor-5α,8α,9β,14β-androstane-11,17-dione for 3α-acetoxy-4α,8,14-trimethyl-18-nor-5α,8α,9β,14β-androstane-11,17-dione, there is obtained 3-ethylenedioxy - 4α,8,14 - trimethyl-17a-oxa-D-homo-18-nor-5α,8α,9β,14β-androstane-11,17-dione.

Example 3.—4α,8,14-trimethyl-17a-oxa-D-homo-18-nor-5α,8α,9β,14β-androstane-3,11,17-trione A solution of 3-ethylenedioxy-4α,8,14-trimethyl-17a-oxa-D-homo-18-nor-5α,8α,9β,14β - androstane - 11,17-dione in 80% acetic acid is kept overnight at room temperature. On dilution with water, there is precipitated 4α,8,14-trimethyl-17a-oxa-D-homo - 18 - nor - 5α,8α,9β,14β-androstane-3,11,17-trione.

Example 4.—4α,8,14-trimethyl-17a-oxa-D-homo-18-nor-5α,8α,9β,14β-androstane-3,11,17-trione A solution of 3-ethylenedioxy-4α,8,14-trimethyl-17α-oxa - D-homo-18-nor-5α,8α,9β,14β-androstane-11,17-dione in methanol containing from two to four drops of 8% sulfuric acid is refluxed for one hour. On dilution with water, there is precipitated the compound of this example.

The invention may be variously otherwise embodied within the scope of the appended claims.

What is claimed is:
1. A compound of the formula

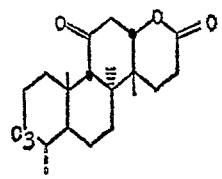

wherein $C_3$ is selected from the group consisting of

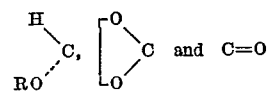

and R is acyl wherein the acyl is a hydrocarbon carboxylic acid of less than twelve carbon atoms.

2. A compound in accordance with the formula of claim 1 having the name 3α-acetoxy-4α,8,14-trimethyl-17a-oxa-D-homo-18-nor-5α,8α9β,14β - androstane-11,17-dione.

3. A compound in accordance with the formula of claim 1 having the name 3-ethylenedioxy-4α,8,14-trimethyl-17a-oxa-D-homo - 18 - nor - 5α,8α,9β,14β-androstane-11,17-dione.

4. A compound in accordance with the formula of claim 1 having the name 4α,8,14-trimethyl-17a-oxa-D-homo-18-nor-5α,8α,9β,14β-androstane-3,11,17-trione.

References Cited

UNITED STATES PATENTS 2,499,247   2/1950   Jacobsen et al. _____ 260—343.2

NICHOLAS S. RIZZO, *Primary Examiner.*

J. H. TURNIPSEED, *Assistant Examiner.*